(12) United States Patent
Jefferies

(10) Patent No.: US 6,375,379 B1
(45) Date of Patent: Apr. 23, 2002

(54) SPIKED HINGE PLATE WITH HOOK

(75) Inventor: Robert Clive Jefferies, Surrey (GB)

(73) Assignee: Fastwall Ltd., Surrey (GB)

( * ) Notice: Subject to any disclaimer, the term of this patent is extended or adjusted under 35 U.S.C. 154(b) by 0 days.

(21) Appl. No.: 09/462,891

(22) PCT Filed: Jul. 16, 1998

(86) PCT No.: PCT/GB98/02097

§ 371 Date: Mar. 27, 2000

§ 102(e) Date: Mar. 27, 2000

(87) PCT Pub. No.: WO99/04174

PCT Pub. Date: Jan. 28, 1999

(30) Foreign Application Priority Data

Jul. 17, 1997 (GB) .............................................. 9715094

(51) Int. Cl.[7] ................................................. F16B 15/06
(52) U.S. Cl. ............................ 403/65; 403/283; 16/387
(58) Field of Search ................................. 403/274, 283, 403/65, 52; 16/387; 248/220.21, 220.22, 220.41, 251, 254

(56) References Cited

U.S. PATENT DOCUMENTS

| | | | | |
|---|---|---|---|---|
| 995,743 A | * | 6/1911 | Warren | 16/387 |
| 2,481,802 A | * | 9/1949 | Wadkins | 16/387 |
| 3,445,883 A | * | 5/1969 | Lowe | 16/387 |
| 5,553,961 A | * | 9/1996 | Olden | 403/283 X |

FOREIGN PATENT DOCUMENTS

| | | |
|---|---|---|
| EP | 0313445 A | 4/1989 |
| FR | 2352196 A | 12/1977 |
| GB | 1439018 A | 6/1976 |

* cited by examiner

Primary Examiner—Lynne H. Browne
Assistant Examiner—John R. Cottingham
(74) Attorney, Agent, or Firm—Connolly Bove Lodge & Hutz, LLP

(57) ABSTRACT

A unitary connector (1) is provided for interconnecting individual panels on a framework of a partitioning system. The connector has a base plate (2) and prongs (4) located on the base plate for engaging a planar surface of a panel. A hook (3) is arranged to be pivotally connected to the base plate for engagement with the support framework attached to the base plate. Conveniently, a plurality of such connectors (1) can be located in a column one beneath the next or side-by-side as appropriate to the size or the plate being attached to a framework. Each connector can be a one piece unitary connector. The unitary connector advantageously provides a base plate of increased strength, grip and purchase on a panel of a partitioning system, and also a substantial reduction both in manufacturing and fitting costs.

17 Claims, 2 Drawing Sheets

SPIKED HINGE PLATE WITH HOOK

IMPROVEMENTS RELATING TO CONNECTION DEVICES

The present invention concerns improvements relating to connection devices and particularly, though not exclusively, to improvements relating to devices for connecting cladding panels to a framework to form demountable partitioning such as that which is described in European Patent No. EP-B-0 521 891 and U.S. Pat. No. 4,245,448.

European Patent No. EP-B-0 521 891 describes a connector for releasably hooking a plasterboard panel onto a support skeleton in order to form a demountable partition. The connector comprises a generally planar base plate attached to the panel by way of a plurality of gang nails which have been punched out of a central section of the base plate. The end portions of the base plate are pressed out into channel defining formations (louvres) which are adapted to engage with and secure an L-shaped hook member. One arm of the hook member is a hook arranged to releasably hook over part of the support skeleton, and the other arm includes a pair of mutually opposed tongues for engaging the channel defining louvres of the base plate.

In practice, the base plates are secured to the plasterboard panel prior to on-site assembly of the demountable partitioning. The panels are then transported to the site where the assembly is completed by connecting the hook members to each of the corresponding base plates and mounting the panel to the framework via the connectors.

The present invention relates to an improved connector from that described hereinabove and has several significant advantages over the prior art connectors.

According to a broad aspect of the present invention there is provided a unitary connector comprising a base plate means located on the base plate for engaging a planar surface and a hook member for engaging a support framework characterized in that the hook member is hingedly connected to the base plate.

In one preferred embodiment of the present invention the base plate has one major planar surface thereof against which the hook member is pivotable for transportation of the connector. Preferably, the hook member has a major planar surface arranged to lie adjacent the base plate when the hook member is pivoted about a pivotal axis of the hinge to lie against the base plate.

Conveniently, another embodiment of the invention may be provided with an overcentre mechanism for holding the hook member in a direction transverse to the direction in which the major planar surface of the base plate extends. Preferably, the overcentre mechanism is mounted on the hook member. The overcentre mechanism is preferably an L-shaped arm extending outwardly from one edge of the hook member and the shorter arm of the L-shaped arm extends on the opposite side of the pivotal axis of the hinge pin to that side adjacent the one edge of the hook member from which the L-shaped arm extends.

The means located on the base plate for engaging the planar surface preferably, in an exemplary embodiment, comprises a plurality of nail-like prongs formed on the base plate arranged to extend outwardly from an opposite side of the base plate to that side thereof from which the hook member extends, as shown in FIGS. 2 and 4. Each prong can be arranged to extend outwardly perpendicularly from the opposite side of the base plate.

Preferably, the prongs are regularly spaced over substantially the whole area of the base plate for maximising strength, grip and purchase of the base plate when applied to a panel of a partitioning system.

Conveniently, the base plate and hook member are interconnected by each being pivotally mounted about a hinge pin. Alternatively, the base plate and hook member can be provided as a one-piece integral construction with the hinge being an area of reduced thickness of the one-piece construction.

One of the major advantages of the present invention over the known connectors is that the task of erecting or dismantling a demountable partitioning is simplified and the overall time of completion reduced thereby. The connectors are premounted in a factory on panels, for example of sheet plasterboard, and in the mounting operation on site, the fitter merely needs to swing the hook arms into position to be ready for mounting the panel on a framework rather than assembling the two-part connector at the installation site. In addition, the use of a unitary connector is advantageous because there is then hardly any possibility of losing or damaging the hooks in transportation to the site during distribution around, or installation on, the site or when the partitioning is demounted for storage. Also, because the hook arms of the present invention preferably fold flat against the base plate, no substantial separate storage space is required for hook arms.

Commonly, two groups of four connectors are arranged in side-by-side columns and are used for securing for example a plasterboard panel of say 2.5 m by 1.2 m to the support framework. Alternatively, the panel may be of medium density fibreboard (MDF) or laminated chipboard, for example.

The above described known connector has pressed out louvre portions on its separate base plate, each louvre portion of which forms a receiving channel for a respective tongue of a fixed right angular hook member attachable on site to the separate base plate which is itself prelocated on the plasterboard in a factory prior to distribution to an installation site. These pressed out louvre portions are prone to deformation prior to assembly, i.e. during the transportation to installation site, and assembly time is often wasted because of the fitters having to bend the louvre portions back into shape to reopen the louvres by use of a screwdriver, for example, so that the tongues of the hook member can enter the respective louvres. The connector of the present invention is preferably of a planar formation without tongues and no separate nail base plate with louvres is provided, thereby avoiding the problems involved with known systems.

Embodiments of the present invention will now be described with reference to the accompanying drawings, in which.

Figure 1:
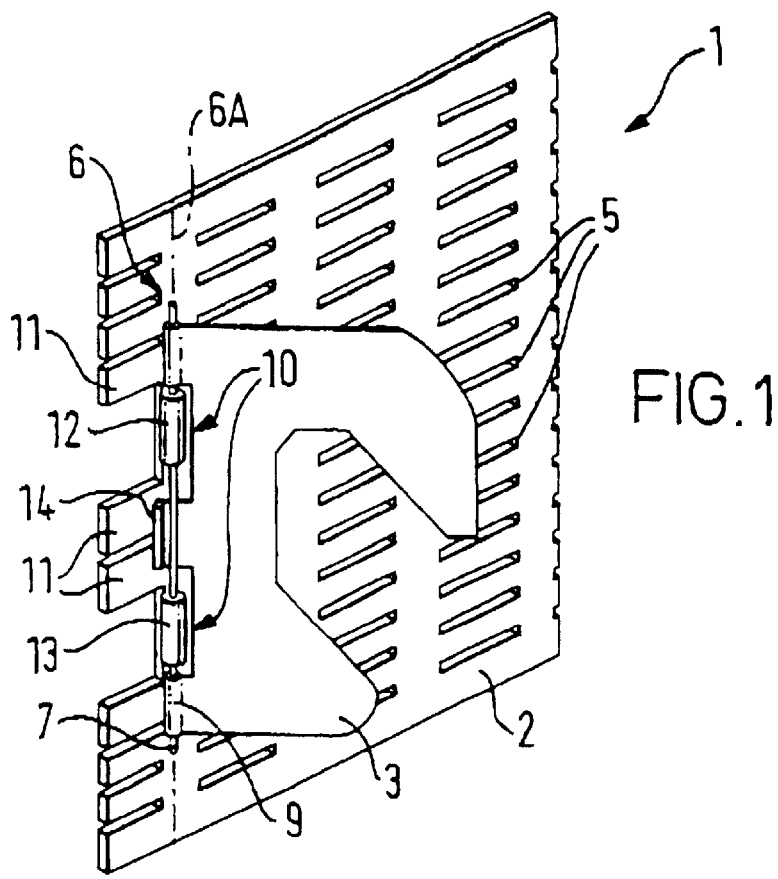
FIG. 1 is a schematic perspective view of a connector embodying the present invention.
Figure 2:
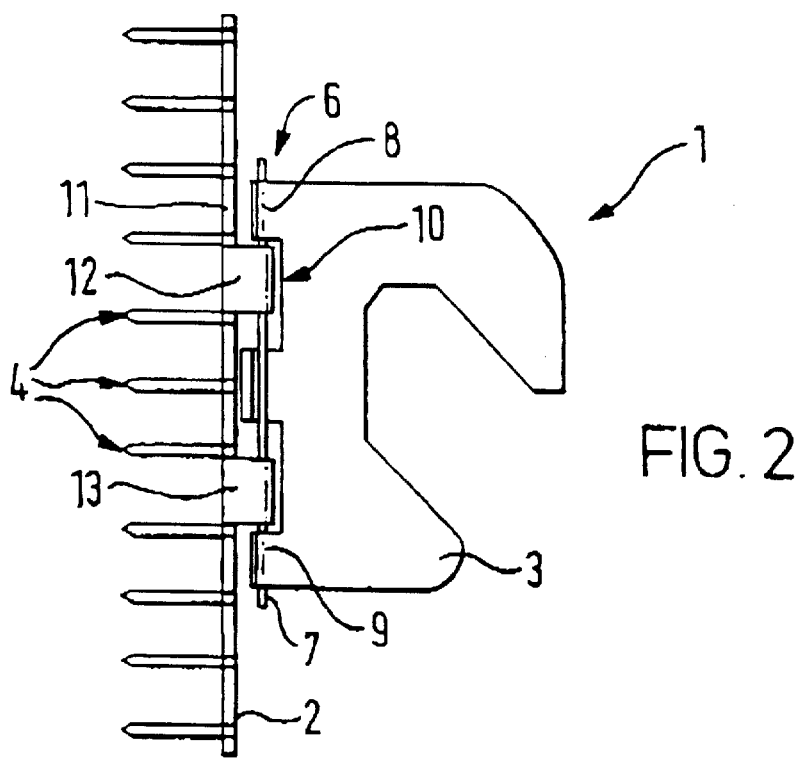
FIG. 2 is a schematic elevated side view of the connector of FIG. 1.

Referring to FIGS. 1 and 2 there is shown a unitary connector 1 embodying the present invention for use in a demountable partitioning system. The connector 1 comprises a base plate 2 and a hook 3 which is hingedly connected to the base plate 2. Both the base plate 2 and the hook 3 are pressed out of planar sheet steel blanks.

The base plate 2 comprises a series of prongs 4 which are formed by punching through respective portions 5 of the base place 2. The resultant prongs 4 allow the base plate 2 to be fixedly attached to a plasterboard panel (not shown) for example.

The prongs 4 are formed over substantially the whole of the area of the base plate 2 including those areas of the plate 2 which in the known systems represent blank tongues to accommodate the insertion of the hook into the louvered pans of the known nail base plate. The increased number of prongs on the base plate of the connector according to the present invention therefore advantageously increases the strength, grip and purchase of the base plate prongs over those of the prior art systems.

The hook 3 is hingedly connected to the base plate 2 by a pin hinge generally shown at 6. The pin hinge 6 comprises an elongate pin 7 around which are bent portions of the base plate 2 and the hook member 3. More specifically and as shown in FIGS. 1 and 2 with a pivotal axis 6A of the hinge extending in a vertical direction in the Figures, the hook 3 has upper and lower bent portions 8, 9 extending from an edge portion 10 thereof. These bent portions 8, 9 are wrapped around the pin 7 to secure the hook 3 thereto.

The base plate 2 has a plurality of edge tangs 11 formed by the process of pressing out the prongs 4. An upper 12 and a lower 13 one of these tangs 11 are wrapped around the pin 7 to secure the pin to the base plate 2. Accordingly, the pin hinge 6 is advantageously formed simply by the provision of the pin 7 and by appropriate bent portions of the base plate 2 and the hook 3.

The hook 3 has an L-shaped arm 14 extending outwardly from a hinge edge of the hook in the same plane as the major planar surface of the hook and which is located between the hinge portions 8, 9 for limiting the range of relative movement between the hook 3 and the base plate 2 about the hinge 6. A shorter arm 15 of the L-shaped arm 14 partially wraps around the pin 7 on substantially the diametrically opposite side thereof to the hinge edge of the hook. This design allows the hook to lie flat against the base plate 2 in a folded transportation position and to be rotatable through 90° and held in that right angled position so that the connector is ready for mounting on horizontal bars of the partition skeleton or framework (not shown).

An outer surface 16 of the shorter arm 15 of the L-shaped arm 14 and opposite to the surface of the shorter arm adjacent the hinge pin 7 is so formed as to act, in combination with the surface of the base plate 2, as an overcentre mechanism for biasing retention of the hook 3 in the framework engagement position. Locking the hook 3 in the framework engagement position is advantageous for ensuring correct assembly during the panel mounting procedure. The L-shaped arm 14 has sufficient resilience as to allow the hook to be moved easily to the transport or storage position.

Figure 3:
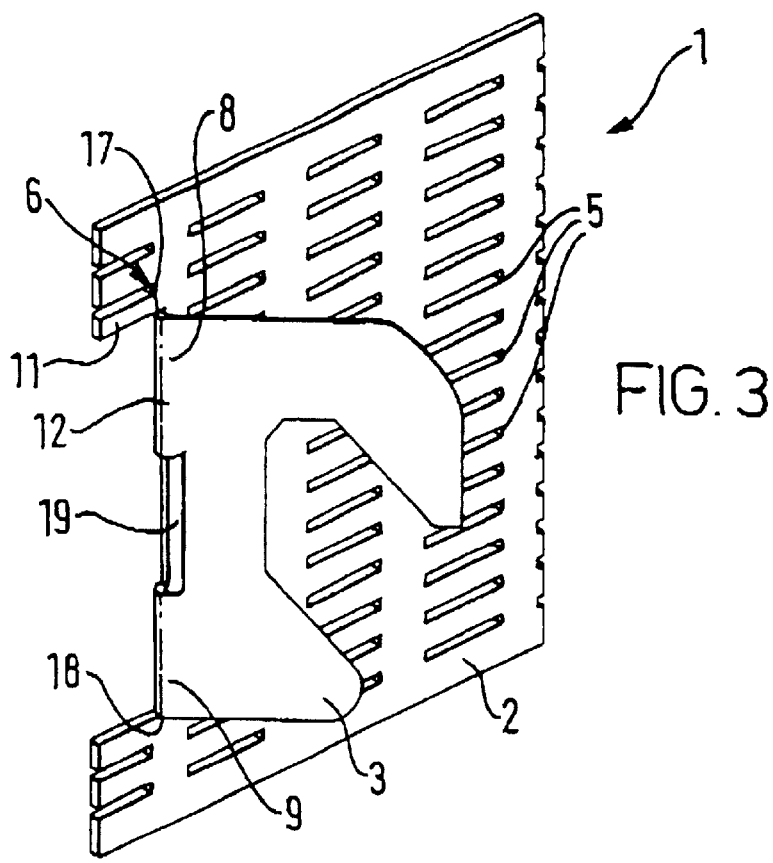
FIG. 3 is a schematic perspective view of one alternative connector embodying the present invention.
Figure 4:
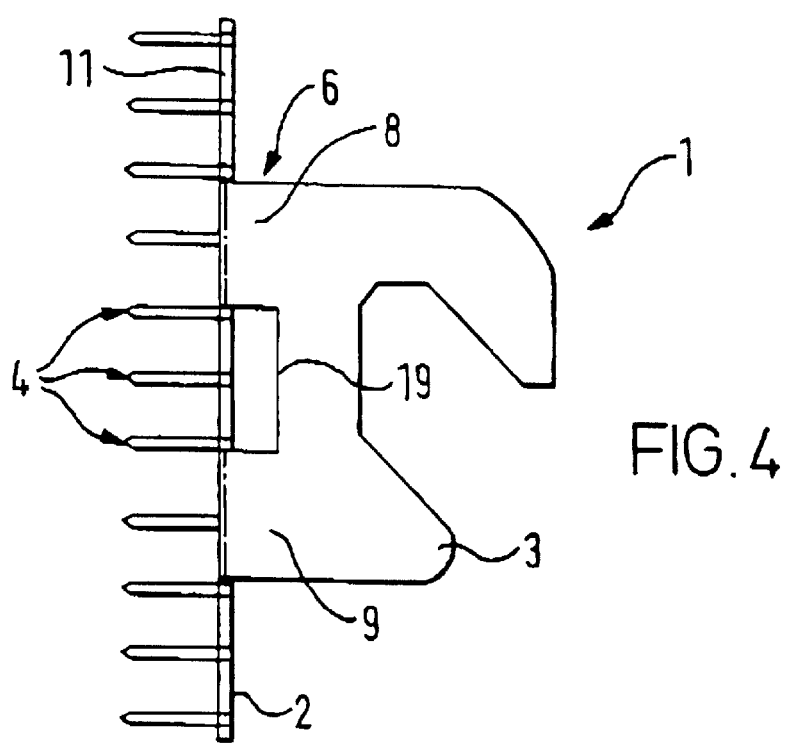
FIG. 4 is a schematic elevated side view of the connector of FIG. 3.

An alternative embodiment of a unitary connector is shown in FIGS. 3 and 4 in which the same reference numerals refer to the same parts in FIGS. 1 and 2, and in which in accordance with the present invention the connector 1 is formed having a hinge 6 which is of a one-piece integral construction with both the base plate 2 and the hook 3 but without the L-shaped arm 14. The remainder of the hinge constituting integral hinge connections 8, 9 between the base plate 2 and hook 3 obviate the need to include hinge pin 6 or bent hinge portions 12 and 13. Portions 17, 18 of the hinge at the junction between the base plate 2 and hook 3 can be of reduced thickness to aid bending outwardly of the hook 3. Furthermore cut-out 19 serves to assist bending of the hook by weakening length of the junction between base plate and hook. Once bent outwardly the hook remains in that position in use. This embodiment would be formed as an integral stamping from a metal sheet and prior to use the hook would be bent up relative to the base plate 2. Prongs 4 are provided on the base plate 2 and project permanently outwards therefrom in the same manner as the prongs 4 of the first described embodiment, for attachment of the unitary connector 1 to a sheet of plasterboard.

The unitary connector is mounted on a panel or sheet of plasterboard at predetermined positions thereon by pressing the prongs 4 of the base plate 2 into the plasterboard in a factory by an appropriate press with the hook 3 pivoted to lie against the base plate 2. Any number of unitary connectors can be attached to the plasterboard in this manner, one below the other, side-by-side, as appropriate for fixing the panel of a chosen size to a skeletal panel supporting framework of a partitioning system. A very small panel may, for example, require say two unitary connectors side-by-side to connect the panel onto the skeleton framework. However, for a much larger panel size such unitary connectors can be arranged in two columns side-by-side with three unitary connectors in each column.

Once the individual panels are delivered to a construction site a fitter pivots the hook of each connector until the hook projects substantially perpendicularly relative to the planar surface of the plasterboard and is held in this outwardly directed position by the overcentre locking action of the L-shaped arm 14 of each unitary connector. The fitter then picks up the panel and locates the panel on the skeletal framework, more particularly, on horizontally extending circular rods forming a part of the framework.

Although the panels are described as being of plasterboard, panels can be of other materials such as, for example, MDF, laminated chipboard, veneered hardwoods or metal. The unitary connectors are of metal such as stainless steel or aluminium to save weight and to meet appropriate fire regulations.

Alternatively, the L-shaped arm 14 can be omitted and the pin hinge 6 can be made fairly stiff relative to the connections with the base plate, and hook so that the hook 3 is not easily moved out of the framework engagement position.

Advantageously, the connector of the present invention is provided with a number of prongs 4 which allow direct mounting of the unitary connector on a panel thereby obviating the need to provide a separate base plate upon which a hook is physically mounted by the fitter on site. Thereby considerable time and expense are saved utilising the unitary connector of the present invention because: (1) a separate base plate with louvres is no longer necessary; (2) separate fixed angled hook connectors do not have to be supplied to the fitter on site; and (3) there is no fitting requirement by the fitter on site he merely pivots outwardly the hook of a premounted connector.

Having described the present invention with reference to specific embodiments, it is to be appreciated that the described embodiments are exemplary only and are susceptible to modification and variation without departure from the invention.

What is claimed is:

1. A unitary connector for use in supporting a partitioning panel from a framework comprising horizontally extending support members, said connector comprising:

a base plate and nail-shaped prongs pressed out substantially perpendicular from and unitary with the base plate for enabling the base plate to be attached to said panel; and a hook member attached to the base plate and freely moveable between a storage position aligned with the base plate and perpendicular to the nail-shaped prongs for enabling stacking of preformed partitioning panels, and a use position perpendicular to die base plate and parallel to the nail-shaped prongs for enabling the partitioning panels to be hung from said horizontally extending support members.

2. A connector as claimed in claim 1, wherein the base plate has a major planar surface thereof against which the hook member is pivotable for transportation of the connector.

3. A connector as claimed in claim 1, wherein the hook member has a major planar surface arranged to lie adjacent the base plate when the hook member is pivoted about a pivotal axis of the hinge to lie against the base plate.

4. A connector as claimed in claim 3, comprising an overcenter mechanism for holding the hook member so as to extend in a direction transverse to the direction in which the major planar surface of the base plate extends.

5. A connector as claimed in claim 4, wherein the overcenter mechanism extends from the hook member.

6. A connector as claimed in claim 4 wherein the overcenter mechanism is an L-shaped arm extending outwardly from one edge of the hook member.

7. A connector as claimed in claim 6, wherein a shorter arm of the L-shaped arm extends on an opposite side of a pivotal axis of the hinge from a side adjacent the one edge of the hook member from which the L-shaped arm extends.

8. A connector as claimed in claim 1, wherein the nail-shaped prongs are attached to the base plate with each prong being arranged to extend outwardly from an opposite side of the base plate to that side from which the hook member extends.

9. A connector as claimed in claim 8, wherein the nail-shaped prongs are spaced in a predetermined pattern over substantially the whole area of the base plate for maximizing strength, grip and security of attachment of the base plate when applied to the partitioning panel.

10. A connector as claimed in claim 1, wherein the base plate and hook member are each pivotally mounted on a hinge pin.

11. A conductor as claimed in claim 10, wherein the hinge pin is tight relative to hinge pin receiving portions of the base plate and hook member for maintaining the hook member in position for hooking on a skeletal framework of a partitioning system.

12. A connector as claimed in claim 1, wherein the connector is an integral unitary construction.

13. A connector as claimed in claim 12, wherein the hinge is an area of reduced thickness of the unitary construction.

14. The connector of claim 1, wherein said hinge is connected to the base plate along a pivotal axis arranged so as to be offset from an edge of the base plate.

15. The connector of claim 1, wherein said base plate is essentially planar across an entire extent of die base plate.

16. The connector of claim 1, wherein said base plate further comprises a plurality of edge tangs located on at least one edge of the base plate.

17. The connector of claim 9, wherein said predetermined pattern spaces said plurality of nail-shaped prongs uniformly in at least one direction across said opposite side of the base plate.

* * * * *